United States Patent [19]

Taka et al.

[11] Patent Number: 4,740,529

[45] Date of Patent: Apr. 26, 1988

[54] HEAT RESISTANT FOAMED SHRINKABLE FILM

[75] Inventors: Toshio Taka, Fujisawa; Takuo Okubo, Yokohama; Kihachi Shishido, Yokohama; Akihiro Hashimoto, Yokohama; Kazuo Yoneda, Chiba, all of Japan

[73] Assignee: Showa Denko Kabushiki Kaisha, Tokyo, Japan

[21] Appl. No.: 105,431

[22] PCT Filed: Jan. 7, 1987

[86] PCT No.: PCT/JP87/00009

§ 371 Date: Sep. 8, 1987

§ 102(e) Date: Sep. 8, 1987

[30] Foreign Application Priority Data

Jan. 7, 1986 [JP] Japan .................................. 61-208
Oct. 15, 1986 [JP] Japan .............................. 61-244688

[51] Int. Cl.⁴ ............................................. C08V 9/00

[52] U.S. Cl. .................................... 521/134; 521/143; 521/144

[58] Field of Search .......................... 521/143, 134, 144

[56] References Cited

U.S. PATENT DOCUMENTS

| | | | |
|---|---|---|---|
| 3,974,237 | 8/1976 | Brumbaugh et al. | 525/323 |
| 4,467,061 | 8/1984 | Yamamoto et al. | 524/528 |
| 4,510,031 | 4/1985 | Matsumura et al. | 521/96 |
| 4,510,292 | 4/1985 | Chiba et al. | 521/79 |
| 4,568,608 | 2/1986 | Kuwabara et al. | 521/59 |

*Primary Examiner*—Morton Foelak
*Attorney, Agent, or Firm*—Sughrue, Mion, Zinn, Macpeak & Seas

[57] ABSTRACT

A heat resistant shrinkable film comprising a composition of (i) 50% to 90% by weight of an ethylene-propylene block copolymer with an ethylene content of 3% to 20% by weight and (ii) 50% to 10% by weight of an ethylene-propylene random copolymer with an ethylene content of 2 to 15% by weight and having a foam ratio of 3.0 or less.

7 Claims, No Drawings

HEAT RESISTANT FOAMED SHRINKABLE FILM

DESCRIPTION

1. Technical Field

The present invention relates to a foamed shrinkable film with superior heat resistance which is suitable for use as, for example, shrink labels of glass containers of, for example, soft drinks. More particularly, the present invention relates to a heat resistant foamed shrinkable film comprising a composition of (i) an ethylene-propylene block copolymer and (ii) an ethylene-propylene random copolymer and having a foam ratio of 3.0 or less. The film has not only a heat resistance able to withstand 30 minutes heating at 120° C. for sterilization, but also a heat shrinkage property of 30% or more at a temperature of 140° C.

2. Background Art

A conventional heat shrinkable film normally begins to shrink at a temperature of 80° C. to 100° C. and displays a large shrinkage of 30% or more at a temperature of approximately 120° C. to 130° C. However, such a film cannot withstand the high temperatures used for such as retort sterilization, since the material generally used as the film material is polyvinyl chloride (PVC), polystyrene (PS), low density polyethylene (LDPE), and other resins which melt at a temperature of 120° C. or more.

On the other hand, a heat shrinkable film comprised of polypropylene, which has an excellent heat resistance, is in general use, but this film must be treated at a high temperature of 150° C. or more to obtain a heat shrinkage of 30% or more. Further, the film is made of polypropylene resin alone (not a composition), and thus a problem arises in that it has a poor buffering ability and heat resistance. In particular, there is a demand for films which can be shrunk and used as a label for bottles or special containers, and which have heat resistance, buffering ability, and heat insulation properties.

As is well known, shrink labels are comprised of heat shrinkable resin films with a foam ratio of approximately 2 to 3, and, for example, the product name, vendor, is printed on one surface thereof. The film is rolled into a tube, the glass container inserted therethrough, and heat applied to shrink the label and thus closely adhere it to the glass container.

This shrink label has a mechanical buffering effect and heat retention and heat insulation properties, since it is a foamed film, and in particular, is suitable as a packaging material for glass containers containing carbonated beverages and other soft drinks.

However, when such foamed shrinkable films are used for shrink labels, to obtain a sufficient buffering effect and heat retention and insulation, it is necessary to increase the foam ratio. If the foam ratio is increased, however, the surface of the film has a large surface roughness, resulting in a rough surface and a reduction of the print finish, particularly the clarity thereof, thus degrading the aesthetic appearance. Conversely, if the foam ratio is made smaller, to increase the printability, a disadvantage arises in that an insufficient buffering effect and heat retention and insulation are obtained.

DISCLOSURE OF THE INVENTION

Therefore, an object of the present invention is to eliminate the problems in the prior art mentioned above and provide a heat resistant shrinkable film which not only has a heat resistance sufficient to withstand heating for sterilization but also has an excellent buffering effect, and further, a large heat shrinkage of 30% or more at a temperature of 140° C.

Another object of the present invention is to provide a foamed heat shrinkable film having a superior buffering ability and heat retention and insulation, and a superior printability.

According to the present invention, there is provided a heat resistant shrinkable film comprising a composition of (i) 50% to 90% by weight of an ethylene-propylene block copolymer with an ethylene content of 3% to 20% by weight and (ii) 50% to 10% by weight of an ethylene-propylene random copolymer with an ethylene content of 2% to 15% by weight and having a foam ratio of 3.0 or less.

Further, according to the present invention, by making the roughness A of the surface of the heat shrinkable film and the roughness B of the reverse thereof both 5 to 25 μm, preferably 10 to 20 μm (determined by JIS-B-0601), more preferably, by making the roughnesses A and B of the surface and reverse thereof:

$$(A-B)/A \geq 0.1$$

there is obtained a foamed shrinkable film having a superior buffering ability and heat retention and insulation, and a superior printability.

BEST MODE FOR CARRYING OUT THE INVENTION

The content of ethylene of the ethylene-propylene block copolymer used in the present invention is 3% to 20% by weight, preferably 3% to 18% by weight, more preferably 2% to 15% by weight. With an ethylene content of the ethylene-propylene block copolymer of less than 3% by weight, the resultant composition does not exhibit a uniform foaming. Conversely, when the content is more than 20% by weight, the film has a low Young's modulus and becomes weak. Therefore these conditions are not preferable.

The block copolymer is widely used and industrially produced by using a stereospecific catalyst (so-called Ziegler Natta catalyst) and copolymerizing propylene and ethylene or combining the copolymerization and polymerization of propylene alone in two or more stages. The process for production, physical properties, etc. are well known.

The ethylene content of the ethylene-propylene random copolymer used in the present invention is 2% to 15% by weight, preferably 3% to 15% by weight, more preferably 3% to 12% by weight. With an ethylene content of the ethylene-propylene random copolymer of less than 2% by weight, a poor heat sealability and heat shrinkability are obtained. On the other hand, when the content is more than 15% by weight, the heat resistance is poor. Note that the ethylene-propylene random copolymer may be copolymerized with other alpha-olefins with as many as 12 carbon atoms, preferably 4 to 10, more preferably 4 to 8. The ratio of copolymerization of alpha-olefins is as much as 10% by weight, preferably 7% by weight or less, more preferably 5% by weight or less.

Even with the above-mentioned ethylene-propylene block copolymer and in the case of this ethylene-propylene random copolymer, the melt flow index (determined according to ASTM D1238, Condition L, below referred to as "MFR") is usually 0.1 to 20 g/10 min, preferably 0.5 to 20 g/10 min, more preferably 1.0 to 15 g/10 min. With an MFR of less than 0.1 g/10 min, foaming becomes difficult, and with an MFR over 20 g/10 min, the resultant film has a low strength and it is difficult to uniformly control the foaming state.

The percent composition of the ethylene-propylene block copolymer (i) in the composition of the present invention is 50% to 90% by weight (that is, the percent composition of the ethylene-propylene random copolymer is 50% to 10% by weight), preferably 50% to 85% by weight, more preferably 55% to 85% by weight. With a percent composition of the ethylene-propylene block copolymer in the composition of less than 50% by weight, the resultant film has a small Young's modulus and a lower strength. On the other hand, when 90% by weight is incorporated, the resultant composition has a poor shrinkability and sealability.

As mentioned above, in a preferred mode of the present invention, the foamed shrinkable film has a roughness of the surface and reverse thereof of 5 to 25 $\mu$m, preferably 10 to 20 $\mu$m, more preferably, a surface roughness A and reverse roughness B satisfying the relationship $(A-B)/A \geq 0.1$. This makes it possible to obtain a foamed shrinkable film having a superior buffering ability and heat retention and insulation, and a superior printability.

The surface roughness of the foamed shrinkable film is determined in the present invention by the methods prescribed in JIS-B-0601. Specifically, use may be made of the contact needle method (JIS-B-0651), the mean roughness direct reading method (JIS-B-0655), the light cutting method (JIS-B-0653), the light wave interference method (JIS-B-0652), the NF roughness method (JIS-B-0656), etc.

With an absolute value of the roughness of the two surfaces of the foamed shrinkable film of less than 5 $\mu$m, the foam ratio must be reduced, and thus the heat retention and insulation and the buffering effect will be insufficient. Further, at a roughness of over 25 $\mu$m, the printability is reduced on both the surface and reverse thereof and it is impossible to obtain a clear print. Further, when $(A-B)/A$ is less than 0.1, the surface cannot be given a sufficiently small roughness and is unsuitable as a printing surface, and the reverse thereof cannot be given a sufficiently large roughness and becomes disadvantageous in terms of the buffering ability and the heat retention and insulation properties. Therefore, the mean foam ratio of the foamed shrinkable film of the present invention is in the range of about 1.5 to 2.0. Further, the draw ratio is suitably in the range of 3.5 to 5.0.

With such a foamed shrinkable film, the surface and reverse thereof differ in roughness, with one side being relatively smooth and having a suitable printability and the other being relatively rough and having a high buffering ability and superior heat retention and insulation.

In producing the composition of the present invention, a chemical foaming agent well known in the field of propylene type resins (for example, izo-bis-isobutyronitrile, azodicarbonamide, N,W'-dinitrosopentamethylenetetramine) is compounded. The percent formulation (percent composition) of the chemical foaming agent is in general 0.1% to 1.5% by weight with respect to the total weight of the afore-mentioned ethylene-propylene block copolymer and ethylene-propylene random copolymer (preferably 0.1% to 1.2% by weight).

The composition of the present invention is obtained by uniformly compounding the afore-mentioned ethylene-propylene block copolymer, ethylene-propylene random copolymer, and chemical foaming agent within the range of the afore-mentioned percent composition. At this time, stabilizers for oxygen, heat, and ultraviolet rays generally used in the field of olefin type resins, lubricants, plasticizers, anti-static agents, and other such additives may be compounded to an extent not substantially changing the properties of the shrinkable film of the present invention.

As the compounding method, use may be made of the method of dry blending using a Henschel mixer or tumbler or other such mixer conventionally used in the field of olefin type resins.

Next, the inflation method, T-die method, etc. using an extruder is used to melt-extrude the resin composition to form a film and cause foaming. In the formation of the film, one side of the extruded molten film is brought into contact with a small diameter cooling roll directly after the extrusion die, and only one side of the film is sprayed with a small amount of cooling water, or other means are employed to preliminarily cool only one side of the film. This preliminary cooling restrains the growth of foam cells on one side of the film and decomposition of the chemical foaming agent, resulting in a restraint of the foaming.

Next, the film is cooled by cooling rolls etc., in this state, and then drawn to obtain the foamed shrinkable film.

By this process for production, the film obtained has a surface and reverse having different foam ratios and different surface roughnesses. By adjusting the extent of preliminary cooling of one side of the film, it is possible to obtain a film satisfying the above relationship $(A-B)/A \geq 0.1$.

The foam ratio of the shrinkable film of the present invention is 3.0 or less, preferably 1.05 to 3.0, more preferably 1.1 to 2.8. If the foam ratio of the film is over 3.0, the resultant film has a rough surface and poor external appearance.

EXAMPLES

The present invention will be now explained in further detail using examples, but of course, the present invention is not limited in scope by these examples.

Note that, in the examples and comparative examples, the heat shrinkage was found by measurement of the heat shrinkage in the longitudinal direction (M direction) at the temperatures of 130° C. and 140° C. in accordance with JIS-Z-1709. Further, the Young's modulus was found by measurement in accordance with ASTM-D-882. Also, the foaming state was determined by observation by the naked eye of the surface of the resultant film and the results evaluated as follows:

⊙: Very good
○: Good
△: Not good
x: Poor

EXAMPLES 1 to 6 and COMPARATIVE EXAMPLES 1 to 4

An ethylene-propylene block copolymer with an ethylene content of 8.0% by weight (MFR 10 g/10 min, hereinafter referred to as "PP (1)") and an ethylene-propylene random copolymer with an ethylene content of 6.9% by weight (MFR 9.0 g/10 min, hereinafter referred to as "PP (2)") but, in Comparative Example 4, use was made only of propylene polymer alone (MFR 8.2 g/10 min, hereinafter referred to a "PP (3)") and in Example 6, use was made of an ethylene-propylene-butene-1 three-way copolymer (MFR 10.0 g/10 min, hereinafter referred to as "PP (4)") in the formulations shown in Table 1 and azodicarbonamide (chemical foaming agent) in an amount of 0.4 part by weight with respect to 100 parts by weight of the total of the copolymers were dry blended in advance for five minutes using a Henschel mixer.

The mixtures (compositions) obtained in this way were extruded using a T-die molder with a diameter of 65 mm at a temperature of 210° C. and cooled 4 cm from the end of the die to produce a thick foamed sheet. The thus obtained hot roll was then used for drawing at the draw ratios shown in Table 1 at a temperature of about 120° C. in the longitudinal direction to produce a film having a thickness of 200 μm.

The heat shrinkage and Young's modulus of the obtained films were determined in the M direction at temperatures of 130° C. and 140° C. Further, the state of foaming was observed by the naked eye.

The results are shown in Table 1.

suitable as a shrinkable label film for beverage bottles requiring retort sterilization.

EXAMPLES 7 to 10 and COMPARATIVE EXAMPLES 5 to 10

The foamed shrinkable film of the present invention was obtained by the method of using various polyolefin type resins and bringing only one side of the molten film, just after exit thereof from the die of the extruder, into contact with a cooling roll. The foamed shrinkable film was measured to obtain the temperature at which the shrinkage thereof in the machine direction became 40% (40% shrinkage temperature), the surface roughness, print finish, and heat retention properties. The 40% shrinkage temperature was measured according to JIS-Z-1709 based on the heat shrinkage rate in the machine direction at various temperatures, and the temperature at which the shrinkage was 40% was obtained from a graph. The surface roughness was found by an SE-3C Universal Surface Configuration Measuring Apparatus made by Kozaka Kenkyusho and by the 10

TABLE 1

| Ex. or Comp. Ex. | Percent composition PP (1) | PP (2) | Foam ratio (times) | Draw ratio (times) | Heat shrinkage in M direction (%) 130 | 140 | Young's modulus (kg/cm$^2$) | Foam state |
|---|---|---|---|---|---|---|---|---|
| Ex. 1 | 85 | 15 | 2.0 | 4.0 | 30 | 40 | 9,200 | ◉ |
| Ex. 2 | 85 | 45 | 2.0 | 4.0 | 40 | 55 | 7,500 | ○ |
| Ex. 3 | 70 | 30 | 2.0 | 4.0 | 35 | 45 | 8,300 | ◉ |
| Ex. 4 | 70 | 30 | 1.3 | 5.0 | 38 | 48 | 8,500 | ◉ |
| Ex. 5 | 70 | 30 | 2.7 | 3.0 | 32 | 43 | 8,100 | ○ |
| Ex. 6 | 70 | 30*2 | 2.7 | 3.0 | 38 | 45 | 8,000 | ○ |
| Comp. Ex. 1 | 95 | 5 | 2.0 | 4.0 | 15 | 22 | 9,800 | ◉ |
| Comp. Ex. 2 | 40 | 60 | 2.0 | 4.0 | 42 | 57 | 5,900 | Δ |
| Comp. Ex. 3 | 70 | 30 | 3.5 | 4.0 | 28 | 43 | 7,000 | x |
| Comp. Ex. 4 | 100*1 | — | 2.0 | 4.0 | 10 | 20 | 12,200 | ○ |

*1 PP(3)
*2 PP(4)

As shown in Examples 1 to 6, by including in the heat shrinkable film of the present invention an ethylene-propylene random copolymer in the percent composition given above, it is possible to increase the heat shrinkage rate by 15% to 20% at the same temperature. That is, it is possible to make the temperature for obtaining the same shrinkage at a temperature 15° C. to 20° C. lower. Further, for the heat sealing temperature, not only is it possible to cause sealing at a temperature of 10° C. to 20° C. lower, but also it is possible to conspicuously improve the appearance of the sealed portion and obtain an excellent sealing. Further, when using this shrinkable film as a label for bottles and containers, the buffering ability and heat insulation are excellent. Furthermore, the heat resistance is excellent even at a relatively high temperature of 120° C. or more, and thus, for example, the film can be used without change even with a 30 minutes' retort sterilization at a temperature of 121° C. In addition, due to the high Young's modulus, the wrapability onto containers is excellent, and thus the heat shrinkable film of the present invention is particularly point mean roughness method of JIS-B-0601-1982. The print finish was observed by the naked eye and evaluated as follows:
◉: Very good
○: Good
Δ: Not good
x: Poor The heat retention was evaluated by wrapping the film around a 300 ml glass container, shrinking the film, filling the container with water and letting it stand in a 70° C. thermostatic oven for one hour, removing the water, holding the film portion of the glass container by hand, and feeling the heat at that time:
○: Can be held for one minute or more
Δ: Can be held for up to 30 seconds
x: Can be held for up to 10 seconds As a comparison, the same examination was performed on foamed shrinkable film produced by the conventional method without preliminary cooling.

The results are shown in Table 2.

TABLE 2

| No. | Resin* type | Mean foam ratio (times) | Draw ratio (times) | 40% shrink temp. (°C.) | Surface roughness (μm) Surface | Reverse | Print finish | Heat retention |
|---|---|---|---|---|---|---|---|---|
| Examples | | | | | | | | |
| 7 | C | 1.9 | 4.0 | 145 | 7 | 13 | ◉ | ○ |
| 8 | C | 1.9 | 4.0 | 130 | 14 | 17 | ○ | ○ |
| 9 | C | 1.9 | 4.0 | 140 | 10 | 15 | ◉ | ○ |
| 10 | C | 1.9 | 4.0 | 123 | 13 | 15 | ○ | ○ |
| Comparative Examples | | | | | | | | |
| 5 | A' | 2.0 | 4.0 | 145 | 20 | 21 | x | ○ |
| 6 | B | 2.0 | 4.5 | 130 | 23 | 24 | x | ○ |

TABLE 2-continued

| No. | Resin* type | Mean foam ratio (times) | Draw ratio (times) | 40% shrink temp. (°C.) | Surface roughness (μm) Surface | Surface roughness (μm) Reverse | Print finish | Heat retention |
|---|---|---|---|---|---|---|---|---|
| 7 | D | 2.0 | 4.0 | 123 | 22 | 23 | x | |
| 8 | A | 1.4 | 4.0 | 155 | 7 | 8 | ◉ | Δ |
| 9 | C | 2.2 | 4.0 | 140 | 30 | 30 | x | ○ |
| 10 | C | 1.5 | 4.0 | 135 | 3 | 10 | ◉ | x |

*Resin type
A: Ethylene-propylene block copolymer, MFR = 10, ethylene content 15% by weight
B: Ethylene-propylene random copolymer, MFR = 7.2, ethylene content 2.5% by weight
C: 7:3 blend polymer of A and B
D: High density polyethylene, melt flow index (measured according to ASTM D 1238, Condition E) = 7.0, density 0.955 g/cm$^3$ As clear from the results of Table 2, the foamed shrinkable film of the present invention is provided with an excellent printability and heat retention. As explained above, the heat shrinkable film of the present invention is relatively smooth at one side of a sheet of the film and relatively rough at the other side, with the smooth side being particularly suitable for printing and the rough side giving sufficient heat retention and buffering ability. Therefore, the foamed shrinkable film is suitable, for example, for sealing labels of one-way containers.

We claim:

1. A foamed heat resistant shrinkable film comprising a composition of (i) 50% to 90% by weight of an ethylene-propylene block copolymer with an ethylene content of 3 to 20% by weight and (ii) 50% to 10% by weight of an ethylene-propylene random copolymer with an ethylene content of 2% to 15% by weight and having a foam ratio of 3.0 or less.

2. A foamed heat resistant shrinkable film according to claim 1, wherein the ethylene content of the ethylene-propylene block copolymer (i) is 3% to 18% by weight.

3. A foamed shrinkable film according to claim 1, wherein the ethylene content of the ethylene-propylene random copolymer (ii) is 3% to 15% by weight.

4. A foamed shrinkable film according to claim 1, wherein the ethylene-propylene random copolymer (ii) further includes, as a copolymerization component, 10% by weight or less of alpha-olefin with 12 carbon atoms or less.

5. A foamed shrinkable film according to claim 1, wherein the roughness A of the surface of the foamed shrinkable film and the roughness B of the reverse thereof are both 5 to 25 μm (roughness measured by JIS-B-0601).

6. A foamed shrinkable film according to claim 5, wherein the roughnesses A and B of the surface and reverse of the film are 5 to 20 μm.

7. A foamed shrinkable film according to claim 5, wherein the roughnesses A and B of the surface and reverse of the film are $(A-B)/A \geq 0.1$.

* * * * *